United States Patent [19]
Gomi

[11] Patent Number: 5,139,120
[45] Date of Patent: Aug. 18, 1992

[54] TORSIONAL DAMPER

[75] Inventor: Shoji Gomi, Kanagawa, Japan

[73] Assignee: Bridgestone Corporation, Tokyo, Japan

[21] Appl. No.: 681,243

[22] Filed: Apr. 5, 1991

[30] Foreign Application Priority Data

Apr. 9, 1990 [JP] Japan .................................. 2-93361

[51] Int. Cl.⁵ .............................................. F16F 7/10
[52] U.S. Cl. .................................... 188/378; 188/379; 74/574
[58] Field of Search ............... 188/268, 290, 293, 296, 188/378, 379, 322.5; 74/574; 464/180

[56] References Cited

U.S. PATENT DOCUMENTS

| 2,477,081 | 7/1949 | Peirce | 74/574 |
| 2,526,744 | 10/1950 | Hardy | 74/574 |
| 3,410,369 | 11/1968 | Ishizuka | 188/379 |
| 3,603,172 | 9/1971 | Hall | 74/574 |
| 3,653,278 | 4/1972 | Brinkman | 74/574 |
| 3,823,619 | 7/1974 | Shotwell | 74/574 |
| 3,992,963 | 11/1976 | Khanna | 188/322.5 |
| 4,046,230 | 9/1977 | Troyer | 74/574 |
| 4,172,510 | 10/1979 | Forkel | 74/574 |

FOREIGN PATENT DOCUMENTS 184971 10/1959 Sweden .................................. 74/574

Primary Examiner—Robert J. Oberleitner
Assistant Examiner—Chris Schwartz
Attorney, Agent, or Firm—Jordan and Hamburg

[57] ABSTRACT

A torsional damper includes a hub to be secured to a rotating shaft such as crank shaft or the like, the hub having formed thereon a projection extending outwardly in the radial direction of the rotating shaft, and damping rings each together with a respective sleeve being bonded to a respective rubber member by vulcanizing and being fitted to the hub as to enclose the projection from both sides in the axial direction of the rotating shaft. The damping rings are secured to each other, and a viscous fluid is charged in a space defined at least around the projection.

3 Claims, 3 Drawing Sheets

TORSIONAL DAMPER

BACKGROUND OF THE INVENTION

1. Field of the Invention

The present invention relates to a torsional damper intended for reduction of vibration and noise and which has a damping ring fixed by means of a rubber member to a hub secured to a rotating shaft such as crank shaft or the like of an internal combustion engine.

2. Description of the Prior Art

There have been proposed various types of torsional dampers, and a typical one of them is shown in FIG. 1. This torsional damper is of a structure in which a hub, not a plate, is secured to the rotating shaft. As shown in FIG. 1, a viscous fluid L is charged in the space defined between a damping ring 100 and the inner wall 102 of a hub 101. More particularly, the hub 101 is generally C-shaped in section, and thus has a circular concavity 103 in which fitted is a damping ring 100 to which a rubber member 104 and sleeve 105 are bonded by vulcanizing. The viscous fluid L is also charged in a space inside the damping ring 100.

Since the outermost circumference of the conventional torsional damper can not be used as the damping ring, namely, the damping ring is fitted in the circular concavity, the torsional damper can not have any large inertial mass. Also, since the length and sectional area of the space where the viscous fluid is charged can not be designed large, the conventional torsional damper has a small capability of damping for the required total operating space thereof.

SUMMARY OF THE INVENTION

Accordingly, the present invention has an object to overcome the above-mentioned drawbacks of the conventional torsional dampers by providing a torsional damper having a larger length and sectional area of the fluid-charged space in the same operating space as the conventional torsional dampers, a larger inertial mass and a higher capability of damping.

The above object can be attained by providing a torsional damper comprising a hub to be secured to a rotating shaft such as crank shaft or the like and which has formed thereon a projection extending outwardly in the radial direction of the rotating shaft; damping rings each together with a respective sleeve being bonded to a respective rubber member vulcanizing and the damping rings being so fitted to the hub as to enclose the projection from both sides in the axial direction of the rotating shaft and being secured to each other; and a viscous fluid charged in a space defined at least around the projection.

Since the damping ring is located at the outermost circumference of the hub, the inertial mass is larger, and also since the viscous fluid is charged around the projection of the hub, the length and sectional area of the fluid-charged space are relatively large. As a result, it is possible to provide a torsional damper of which the damping capability is large.

These and other objects and advantages of the present invention will be better understood from the following description made, by way of example, of the embodiments of the torsional damper according to the present invention with reference to the drawings.

DETAILED DESCRIPTION OF THE PREFERRED EMBODIMENTS

Figure 1:
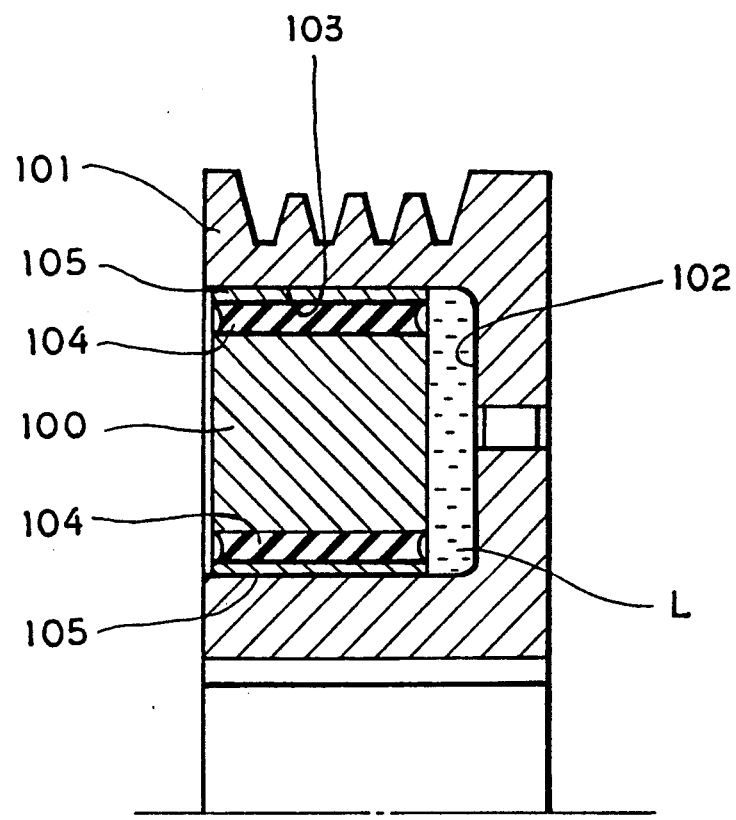
FIG. 1 is a sectional view of a conventional torsional damper.
Figure 2:
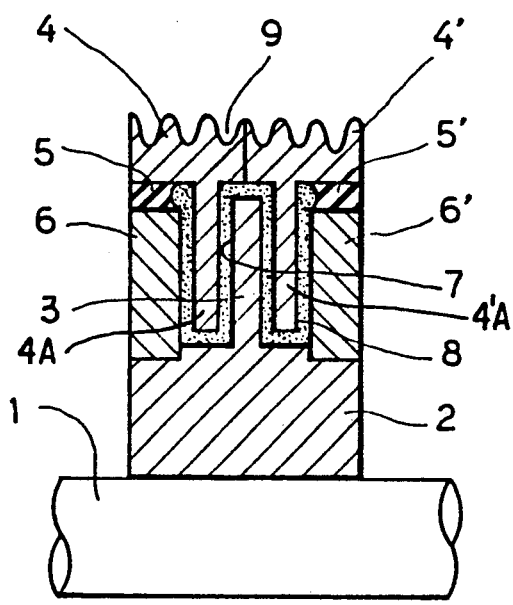
FIG. 2 is a sectional view of a first embodiment of the torsional damper according to the present invention.
Figure 3:
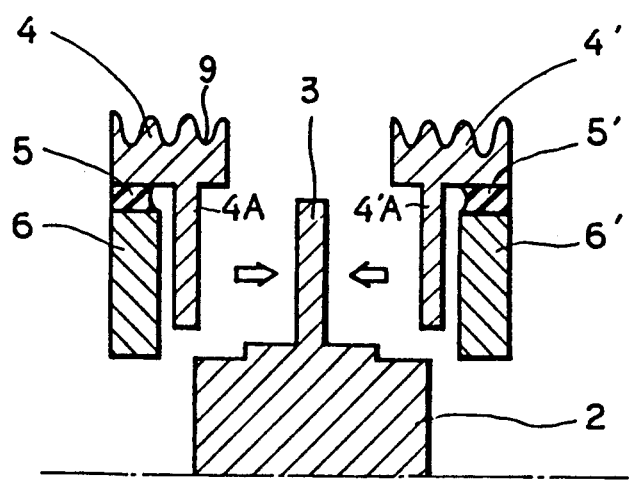
FIG. 3 is a sectional view of the torsional damper before the damping rings are fitted.

In the first embodiment shown in FIG. 2, a rotating shaft 1 such as crank shaft or the like has a hub 2 fixed thereon. A projection 3 is formed approximately at the middle of the axial length of the hub 2 and extends from the hub 2 outwardly in the radial direction of the hub 2. Damping rings 4 and 4' are so fitted to the hub 2 as to enclose the projection 3 from both sides in the axial direction of the rotating shaft 1. The damping ring 4 and a sleeve 6 are bonded to a rubber member 5 by vulcanizing. Also, the damping ring 4' and a sleeve 6' are bonded to a rubber member 5' by vulcanizing. The damping rings 4 and 4' have at least respective projections 4A and 4'A formed thereon and extending inwardly therefrom. These projections 4A and 4' A are provided to enclose the projection 3. As shown in FIG. 3, the damping rings 4 and 4' are fitted to the hub 2 from both sides in the axial direction of the rotating shaft 1 and they are welded at abutting positions. When the hub 2 and sleeves 6 and 6' are welded or the sleeves 6 and 6' are simply force-fitted into the hub 2, a space 7 is defined around the projection 3. A viscous fluid 8 such as silicone oil or the line is charged in this space 7. According to the first embodiment, the space 7 is formed between the damping rings 4 and 4' and the projection 3, between the projection 3 and the projections 4A and 4' A, between the hub 2 and the projections 4A and 4' A and between the sleeves 6 and 6' and the projections 4A and 4' A. Namely, the viscous fluid 8 is charged in the approximately zigzag-shaped space 7.

This arrangement increases the length of the space in its section, thereby improving the capability of damping.

Figure 4:
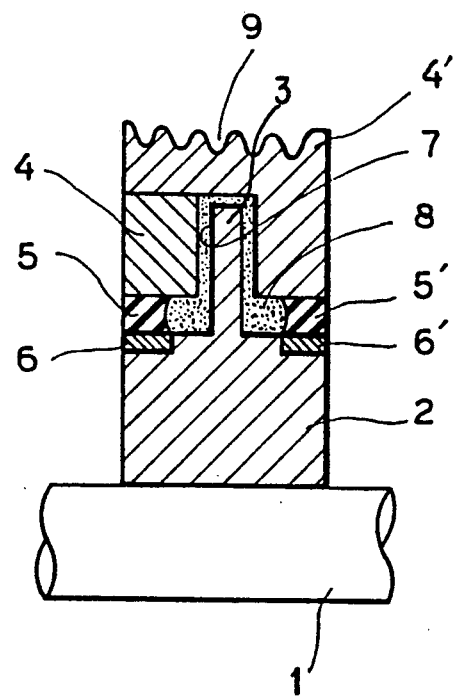
FIG. 4 is a sectional view of a second embodiment of the torsional damper according to the present invention.

The second embodiment shown in FIG. 4 employs damping rings 4 and 4' different in shape from those in the first embodiment. In this embodiment, the viscous fluid 8 is charged in the space 7 formed only around the projection 3. The section of the damping ring 4' taken along the radial direction of the rotating shaft 1 is L-shaped. One side of the L-shaped section covers the outermost circumference of the projection 3. The section of the damping ring 4 taken along the radial direction of the rotating shaft 1 and which encloses the projection 3 along with the L-shaped damping ring 4' takes the form of a rectangle. The damping rings 4 and 4' have a rubber member 5 and a sleeve 6, and a rubber member 5' and a sleeve 6', respectively, bonded by vulcanizing on the respective faces thereof opposite to the hub 2. The sleeves 6 and 6' are welded to the hub 2 or force-fitted into the hub 2. According to the second embodiment, the total section of the damping rings 4 and 4' taken along the radial direction of the rotating shaft 1 can have an increased area, which leads to an increased mass of the damping rings 4 and 4'.

In both the first and second embodiments, the damping rings 4 and 4' are located on the radial outermost circumference in such a manner that the inertial mass can be made large. Also, in these embodiments, pulley recesses 9 are formed on the outermost circumference of the damping rings 4 and 4'. For charging the viscous fluid 8 into the space 7, a hole(not shown) is formed which communicates between the outside and the space 7. The hole is closed after the viscous fluid 8 is filled into the space therethrough. The shapes of the damping rings 4 and 4' are not limited to those having been illustrated and described provided they are such that the space 7 to be filled with the viscous fluid 8 is formed around the projection 3.

What is claimed is:

1. A torsional damper, consisting essentially of:

a hub adapted to be secured to a rotating shaft coaxially therewith, said hub having a main body, a projection formed on said main body and extending radially outwardly therefrom, and respective radially outer surfaces substantially parallel to a rotating axis of said rotating shaft formed at respective axial end portions of said main body of said hub;

damping members each comprising a damping ring, a rubber member and a sleeve, said damping ring being bonded radially outwardly to said rubber member by vulcanizing, said sleeve being bonded radially inwardly to said rubber member by vulcanizing and having a radially inner surface substantially parallel to said rotating axis, said damping rings being secured to each other and said radially inner surface of each of said sleeves being fitted in abutting relation to a respective radially outer surface of said main body of said hub such that said damping members enclose said projection from opposite sides in the axial direction of said hub to form a continuous enclosed chamber at least around said projection defined in part by opposite axial sides and a radially outer side of said projection; and a viscous fluid charged into said continuous enclosed chamber.

2. A torsional damper according to claim 1, wherein each of said damping rings has a main body and at least one projection formed on said main body and extending radially inwardly therefrom, said continuous enclosed chamber being defined between the hub projection and the projection of each of the damping rings, the main body of each of the damping rings and the hub projection, the main body of the hub and the projection of each of the damping rings and between the sleeves and the projections of the damping rings.

3. A torsional damper according to claim 1, wherein one of said damping members has an L-shaped section taken along the radial direction of said hub and another of said damping members has a rectangular section taken along the radial direction of said hub, the L-shaped and rectangular section damping members being secured to each other so as together to enclose said hub projection and to define at least in part said continuous enclosed chamber.

* * * * *